United States Patent
Huapaya et al.

(10) Patent No.: US 11,196,722 B2
(45) Date of Patent: Dec. 7, 2021

(54) METHOD FOR MUTUAL SYMMETRIC AUTHENTICATION BETWEEN A FIRST APPLICATION AND A SECOND APPLICATION

(71) Applicants: THALES DIS FRANCE SA, Meudon (FR); SAFENET CANADA INC., Ottawa (CA)

(72) Inventors: Luis Miguel Huapaya, Ottawa (CA); Anne-Marie Praden, Gemenos (FR)

(73) Assignees: THALES DIS FRANCE SA, Meudon (FR); THALES DIS CPL CANADA INC., Ottowa (CA)

(*) Notice: Subject to any disclaimer, the term of this patent is extended or adjusted under 35 U.S.C. 154(b) by 174 days.

(21) Appl. No.: 16/621,466

(22) PCT Filed: Apr. 4, 2018

(86) PCT No.: PCT/EP2018/058641
§ 371 (c)(1),
(2) Date: Dec. 11, 2019

(87) PCT Pub. No.: WO2018/228732
PCT Pub. Date: Dec. 20, 2018

(65) Prior Publication Data
US 2020/0177563 A1 Jun. 4, 2020

(30) Foreign Application Priority Data
Jun. 14, 2017 (EP) .................................... 17305728

(51) Int. Cl.
*H04L 29/06* (2006.01)
*H04L 9/14* (2006.01)
(Continued)

(52) U.S. Cl.
CPC ........ *H04L 63/0435* (2013.01); *H04L 9/0877* (2013.01); *H04L 9/14* (2013.01);
(Continued)

(58) Field of Classification Search
CPC ... H04L 9/3234; H04L 63/061; H04L 9/3218; H04L 9/0877; H04L 9/3273;
(Continued)

(56) References Cited

U.S. PATENT DOCUMENTS

| | | | |
|---|---|---|---|
| 7,861,078 B2 * | 12/2010 | Funk | H04L 9/0863 713/155 |
| 7,900,247 B2 * | 3/2011 | Chong | H04L 67/02 726/10 |

(Continued)

OTHER PUBLICATIONS

International Search Report (PCT/ISA/210) and Written Opinion (PCT/ISA/237) dated Jul. 2, 2018, by the European Patent Office as the International Searching Authority for International Application No. PCT/EP2018/058641.

*Primary Examiner* — Mohammad A Siddiqi
(74) *Attorney, Agent, or Firm* — Buchanan Ingersoll & Rooney PC

(57) ABSTRACT

A first server exchanges with a second server a master (symmetric) key(s). The first server sends to the first application the master key(s). The second server generates dynamically a first derived key by using a generation parameter(s) and a first master key. The second server sends to the second application the first derived key and the generation parameter(s). The second application generates and sends to the first application a first (key possession) proof and the generation parameter(s). The first application verifies successfully by using the generation parameter(s), the first master key and the first proof, that the first proof has been generated by using the first derived key, generates and sends to the second application a second (key possession)

(Continued)

proof. The second application verifies successfully that the second proof has been generated by using the first derived key, as a dynamically generated and proven shared key.

10 Claims, 2 Drawing Sheets

(51) Int. Cl.
 *H04L 9/32* (2006.01)
 *H04L 9/08* (2006.01)
(52) U.S. Cl.
 CPC .......... *H04L 9/3218* (2013.01); *H04L 9/3234* (2013.01); *H04L 63/061* (2013.01)
(58) Field of Classification Search
 CPC ....... H04L 63/0435; H04L 9/14; H04L 9/088; H04L 2209/127; H04L 2209/38
 See application file for complete search history.

(56) References Cited

U.S. PATENT DOCUMENTS

| | | | | |
|---|---|---|---|---|
| 8,612,771 | B2 * | 12/2013 | Zollinger | H04N 21/25816 |
| | | | | 713/189 |
| 9,509,502 | B2 * | 11/2016 | Schulz | H04L 9/3271 |
| 9,602,288 | B1 * | 3/2017 | Mikulski | H04L 9/3247 |
| 2009/0210696 | A1 * | 8/2009 | Moreau | H04L 9/302 |
| | | | | 713/151 |
| 2010/0138652 | A1 * | 6/2010 | Sela | H04L 9/3268 |
| | | | | 713/158 |
| 2010/0306531 | A1 | 12/2010 | Nahari | |
| 2012/0072714 | A1 | 3/2012 | Grandcolas et al. | |
| 2013/0179695 | A1 | 7/2013 | Zollinger et al. | |
| 2015/0222517 | A1 * | 8/2015 | McLaughlin | H04W 12/50 |
| | | | | 713/156 |
| 2016/0191494 | A1 * | 6/2016 | Claes | H04L 63/0853 |
| | | | | 713/159 |

\* cited by examiner

METHOD FOR MUTUAL SYMMETRIC AUTHENTICATION BETWEEN A FIRST APPLICATION AND A SECOND APPLICATION

FIELD OF THE INVENTION

The invention relates generally to a method for mutual symmetric authentication between a first application and a second application.

The present invention may be notably applicable to a cloud computing network in which a server supports one of the first and second applications, like e.g., a Hardware Mediated Enclave (or HME), such as Intel (registered Trademark) Software Guard eXtensions (or SGX), that may carry out a Network Virtual Function (or NVF).

Within the present description, an HME includes secure code to be run by a processor, like e.g., a Central Processing Unit (or CPU), that offers confidentiality and integrity to both the code and data within the enclave such that the only code that accesses the data within the enclave is the secure code within the enclave. Such a guarantee is enforced by the processor itself, irrespective in particular of the host Operating System (or OS). In other words, any other code (including kernel level code) running under any level of privilege (including administrative/root privilege) does not access the secure code within the enclave.

The present invention may be notably applicable to a mobile radio-communication field in which a mobile terminal, like e.g., a mobile (tele)phone, as a standalone entity or in cooperation with a device(s), like e.g., a Secure Element (or SE), that supports one of the first and second applications.

Within the present description, an SE is a smart object that includes a chip(s) that protect(s), as a tamper resistant component(s), access to stored data and that is intended to communicate data with a device(s), like e.g., an SE host device, such as a (mobile) phone.

The present invention may be notably applicable to two or more Hardware Security Module (or HSM) type servers, as servers which are able to provide one or more keys. The HSM type servers are preferably connected with each other through a secure data exchange mechanism, like e.g., a block chain mechanism, which allows separate HSM type server to establish trust between each other.

STATE OF THE ART

It is known to mutually authenticate between two applications by using a Public Key Infrastructure (or PKI) technology.

However, such a PKI technology is very expensive to implement since it needs to configure, at the manufacturing, a device that supports each application while providing the device with a key pair, i.e. a private key and a corresponding public key.

Moreover, such a PKI technology is very slow to operate since an heavy process is to be implemented while involving a communication with a certificate authority to verify the non-repudiation of the device.

Finally, such a PKI technology based on an asymmetric cryptography is known as being non-resistant to quantum computing. As known per se, the asymmetric cryptography means that a public key is used for encryption and a corresponding private key that is distinct from the public key is used for decryption.

There is a need of an alternative solution while being less expensive, quicker and more secure than the known solution using a PKI technology.

SUMMARY OF THE INVENTION

The invention proposes a solution for satisfying the just herein above specified need by providing a method for mutual symmetric authentication between a first application and a second application.

According to the invention, the method comprises the following steps. A first server, as a first element comprised within a distributed trust chain, sends to and/or receives from at least one second server, as a second element comprised within the distributed trust chain, at least one master symmetric key. The first server sends to the first application the at least one master symmetric key. The second server generates dynamically a first derived symmetric key by using at least one key generation parameter and a first master symmetric key comprised within the at least one master symmetric key. The second server sends to the second application the first derived symmetric key and the at least one key generation parameter. The second application generates a first key possession proof by using the first derived symmetric key. The second application sends to the first application the first key possession proof and the at least one key generation parameter. The first application verifies successfully by using the at least one key generation parameter, the first master symmetric key and the first key possession proof, that the first key possession proof has been generated by using the first derived symmetric key. The first application generates a second key possession proof by using the first derived symmetric key. The first application sends to the second application at least the second key possession proof. The second application verifies successfully by using the second key possession proof that the second key possession proof has been generated by using the first derived symmetric key, as a dynamically generated and proven shared key.

The principle of the invention consists in using first and second servers, like e.g., HSM type servers, comprised within a (distributed) trust chain. The first server provides the first application with one (or more) master symmetric key(s) exchanged between the servers. The second server provides the second application with a first derived symmetric key that is generated on the fly by the second server on a basis of one or several parameters and a first master symmetric key provided to the first application by the first server. The second application generates with the first derived symmetric key a first key possession proof. The second application transmits to the first application the first key possession proof accompanied with the parameter(s) used to generate the first derived symmetric key. The first application checks whether the first key possession proof has or has not been generated with the first derived symmetric key while using the first master symmetric key, the first key possession proof and the parameter(s) used to generate the first derived symmetric key. Only if the first application checks that the first key possession proof has been generated with the first derived symmetric key, the first application knows that the second application possesses the first derived symmetric key that has been dynamically generated. The first application generates with the first derived symmetric key a second key possession proof. The first application sends to the second application at least the second key possession proof. The second application checks whether the second key possession proof has or has not been generated with the first derived symmetric key while using the first derived symmetric key. Only if the second application checks that the second key possession proof has been generated with the first derived symmetric key, the second application knows that the first and second applications share both the first derived symmetric key that has been dynamically generated.

The invention solution is based on a dynamically generated symmetric key, so as to carry out a mutual authentication between the first and the second application by using a symmetric cryptography. As known per se, the symmetric cryptography means that the same key is used for both encryption and decryption.

Thus, contrary to the known PKI technology, the invention solution does not need to configure, at the manufacturing, a device that supports each of the first and second applications while providing the device with any key.

The invention solution is fast, e.g. less than some tenths of microseconds, to operate since the invention solution is based on a symmetric cryptography and the symmetric key used to mutually authenticate between the first and second applications is dynamically yield, i.e. when the two applications are used on the field.

The invention solution is secure since each of the first and second applications ensures, after a verification, that the other of the first and second applications possesses the dynamically generated symmetric key.

The invention solution is more secure than with the known solution using the PKI technology since the invention solution is based on a symmetric cryptography that is known notably as being more resistant to quantum computing.

Thus, the invention solution enhances by using a symmetric cryptography the security with respect to the known PKI based solution.

It is to be noted that a mechanism used to exchange securely data, like e.g., a master symmetric key(s) used to generate the dynamically generated symmetric key, between the first and second servers, as distributed trust chain elements, may be based on any secure data exchange technology, like e.g., a block chain technology.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered an exemplary embodiment in which the invention method for mutual symmetric authentication between a first and a second application is implemented by two HSM type servers, as two servers, an HME, as the first application, supported by a cloud server, as a first device, and a mobile application, as the second application, supported by a mobile phone, as a second device.

According to another exemplary embodiment(s) (not represented), the invention method for mutual symmetric authentication between a first and a second application is implemented by an HSM type server, a first application supported by a first device and a second application supported by a second device (or the first device). In other words, the HSM type server does not cooperate with any other HSM type server, i.e. the two applications are managed by one and the same HSM type server. According to such an exemplary embodiment(s), the HSM type server is adapted to perform the functions that are carried out by the two HSM type servers and described infra. Naturally, the herein below described embodiment is only for exemplifying purposes and is not considered to reduce the scope of the invention.

Figure 1:
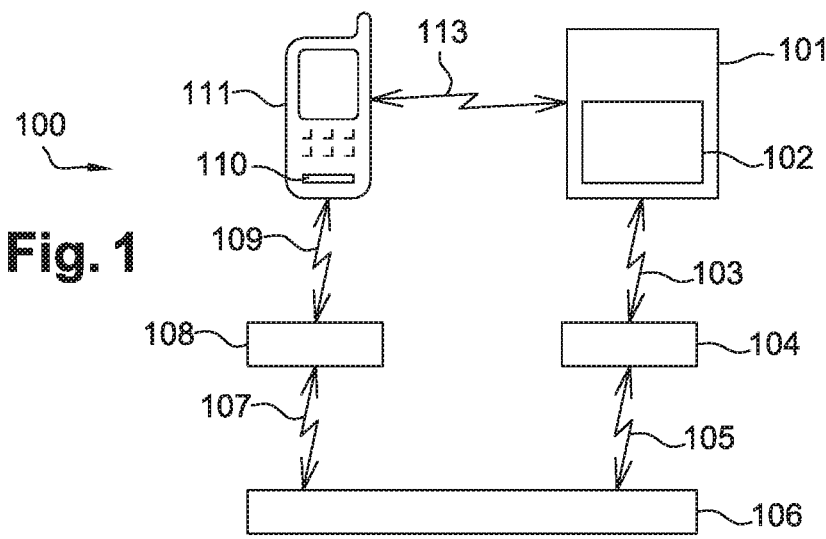
FIG. 1 illustrates a simplified diagram of an embodiment of a system that comprises a first and a second HSM, a cloud server supporting a first application, and a client device supporting a second application, and that is adapted to implement a particular embodiment of a method for mutual symmetric authentication between the first and the second application based on a first derived symmetric key that has been dynamically generated, according to the invention.

FIG. 1 shows schematically a system 100 including an HME 102, a first HSM 104, a mobile application 110 and a second HSM 108.

A cloud server 101 is comprised within a cloud computing network (not represented).

The cloud server 101 possibly in a data center supports a host application.

The cloud server 101 includes one or several CPUs (not represented), as data processing means, one or several memories (not represented), as data storing means, and one or several Input/Output (I/O) interfaces (not represented) that are internally all connected to each other.

The cloud server memory stores an Operating System (or OS).

The host application hosts the HME 102, as a first application. The host application cooperates with the HME 102 which is a part (or subset) of the host application. The HME 102, when executed, may carry out a Network Virtual Function (or NVF).

The HME 102, like e.g., Intel SGX, is to be executed or run by a cloud server CPU or a dedicated processor (or microprocessor) at the cloud server 101.

The HME 102 is connected, through one or several intermediary network entities (not represented), over a preferably bi-directional link 103, to the first HSM 104.

The first HSM 104 is operated by a first service provider (or on its behalf). The first HSM 104 is connected, over a bi-directional link 105, to a block chain mechanism 106 or any other secure data exchange mechanism.

The first HSM 104 includes one or several CPUs (not represented), as data processing means, one or several memories (not represented), as data storing means, and one or several I/O interfaces (not represented) that are internally all connected to each other.

The first HSM memory stores an OS.

The first HSM 104 is preferably able to generate and store one or several master symmetric keys, as a first master symmetric key set.

The first HSM memory stores preferably one or several cryptographic keys that are used to facilitate a high speed secure mechanism allowing to prove that the HME 102 satisfies one or several predetermined security conditions or constraints, so as to provide securely and trustfully the HME 102 with the first master symmetric key set.

The first HSM 104 is able to provide the HME 102 with one or several master symmetric keys preferably only if a predetermined security constraint(s) (like e.g., one or several successful completions of verification of an attestation, an authentication of the first application and/or an authentication of the first application, as described infra) relating to the addressee of the master symmetric key(s) is(are) satisfied. When two or more master symmetric keys are provided, the first HSM 104 sends the master symmetric keys in association with their respective Universally Unique IDentifier (or UUID) or the like, as data relating to a unique identifier relating to each master symmetric key that is included within a master symmetric key set in association with each master symmetric key.

A (mobile) phone 111 (or the cloud server 101 or another cloud server in another embodiment of the invention method) supports the mobile application 110, as a second application.

The mobile application 110 is connected, through one or several intermediary network entities (not represented), over a preferably bi-directional link 109, to the second HSM 108.

The second HSM 108 is operated preferably by a second service provider (or an infrastructure provider) (or on its behalf) that is distinct from the first service provider.

The different service providers do not know each other.

Alternatively, instead of two different service providers, the first 104 and second 108 HSMs are operated by one and the same service provider.

Each service provider has its own HSM(s) with their own respective master symmetric key(s).

The second HSM 108 is connected, over a bi-directional link 107, to the block chain mechanism 106 (or any other secure data exchange mechanism).

The second HSM 108 includes one or several CPUs (not represented), as data processing means, one or several memories (not represented), as data storing means, and one or several I/O interfaces (not represented) that are all connected to each other.

The second HSM memory stores an OS.

The second HSM 108 is preferably able to generate and store one or several master symmetric keys, as a second master symmetric key set. The second master symmetric key set is distinct from the first master symmetric key set.

The second HSM memory stores preferably one or several cryptographic keys that are used to facilitate a high speed secure mechanism allowing to prove that the mobile application 110 satisfies one or several predetermined security constraints, so as to provide securely and trustfully the mobile application 110 with the first derived symmetric key.

According to an essential invention feature, the second HSM 108 is configured to generate dynamically a first derived symmetric by using e.g. a nonce, as a random that the second HSM 108 has previously generated and that is used only once, as a key generation parameter, and a first master symmetric key.

To increase the difficulty (and thus to enhance the security) to generate dynamically a first derived symmetric key, (an)other key generation parameter(s), like e.g., data relating to a unique identifier relating to a predetermined Key Derivation Function (or KDF) to be used by the second HSM 108 and the HME 102, may be added.

The first master symmetric key is included within the first or the second master symmetric key set.

The first master symmetric key may have been previously generated by the second HSM 108 or the first HSM 104.

The first master symmetric key is exchanged securely between the first 104 and second 108 HSMs over the block chain mechanism 106 (or any other secure data exchange mechanism).

The block chain mechanism 106 or any other secure data exchange mechanism allows exchanging securely data, like e.g., a master symmetric key(s) possibly accompanied with a corresponding associated UUID(s) (or other data relating to a unique identifier relating to each master symmetric key), between notably the first 104 and second 108 HSMs (among others).

The block chain mechanism 106 or any other secure data exchange mechanism allows the first HSM 104 relating to the first service provider to establish trust with the second HSM 108 relating to the second service provider. Thus, the first HSM 104 and the second HSM 108 securely exchange one or several sets of master symmetric keys and possibly (an)other key(s). The other key(s) is(are) used preferably to facilitate and therefore speed up a mechanism for letting the HME 102 and/or the mobile application 110 satisfy one or several predetermined security constraints, so as to be provided with a master symmetric key(s) including the first master symmetric key (for the HME 102) by the first HSM 104 and/or the first derived symmetric key (for the mobile application 110) by the second HSM 108.

The block chain mechanism 106 or any other secure data exchange mechanism allows each HSM 104 or 108 to securely connect to other HSM 108 or 104 and to exchange data, like e.g., each other set of master symmetric keys, such that, at any given time, each HSM 104 or 108 stores the master symmetric key set from all of the different HSM 108 or 104 across the distributed trust chain.

The second HSM 108 establishes, through the block chain mechanism 106 (or any other secure data exchange mechanism), trust with the first HSM 104 and conversely, i.e. the first HSM 104 establishes, through the block chain mechanism 106 (or any other secure data exchange mechanism), trust with the second HSM 108.

The first HSM 104 constitutes a first element comprised within a distributed trust chain.

The second HSM 108 constitutes a second element that is distinct from the first element and comprised within the distributed trust chain.

Each of the first HSM 104 and the second HSM 108 is able to get securely any master symmetric key set generated by the other of the first HSM 104 and the second HSM 108.

According to an essential invention feature, the second HSM 108 is configured to provide the mobile application 110 with the first derived symmetric key, as dynamically generated symmetric key, the key generation parameter(s) that has(have) been used to generate the first derived symmetric key, and preferably (while not being mandatory) data relating to a unique identifier relating to the first master symmetric key (that has(have) been used to generate the first derived symmetric key).

The phone 111 includes one or several CPUs (not represented), as data processing means, one or several memories (not represented), as data storing means, and one or several I/O interfaces (not represented) that are internally all connected to each other. The phone memory stores an OS.

The mobile application 110 is to be executed or run by a phone CPU or a dedicated processor (or microprocessor, like e.g., the one of an SE) at the phone 111.

The mobile application 110 may be supported by an SE chip (not represented).

The invention does not impose any constraint as to a kind of the SE, when present.

The SE may be an incorporated chip, like e.g., an embedded Universal Integrated Circuit Card (or eUICC) or an integrated Universal Integrated Circuit Card (or iUICC), within a terminal, as an SE host device, or a chip that is coupled to the terminal, as an SE host device, and included within a smart card (or another medium). The chip may therefore be fixed to or removable from its host device, like e.g., a mobile phone.

The invention does not impose any constraint as to a kind of the SE type.

The SE may have different form factors.

As removable SE, it may be a Subscriber Identity Module (or SIM) type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device, as a device for authenticating a user.

The SE chip(s) may incorporate at least part of the phone component(s), like e.g., a baseband processor, an application processor(s) and/or other electronic component(s).

Alternately, the SE chip(s) include(s) a Trusted Execution Environment (or TEE), as a secure area of a phone (or terminal) processor and a secured runtime environment.

The SE chip(s) is(are) preferably incorporated, possibly in a removable manner, within a Printed Circuit Board (or PCB) of the phone 111, as an SE host device.

According to an essential invention feature, the mobile application 110 is adapted to generate, by using the first derived symmetric key, e.g. an encrypted first nonce and/or an encrypted hash of the first nonce or the like, as a first key possession proof.

To generate the first key possession proof, the mobile application 110 uses a predetermined first encryption algorithm, like e.g., an Advanced Encryption Standard (or AES), a Data Encryption Standard (or DES) or a 3DES, with the first derived symmetric key. As known per se, a corresponding first decryption algorithm is the first encryption algorithm.

The mobile application 110 is able to send, over a bi-directional link 113, to the HME 102 the first key possession proof along with the key generation parameter(s) that has(have) been used to generate the first derived symmetric key. The mobile application 110 is preferably able to send, besides the first key possession proof and the key generation parameter(s), data relating to a unique identifier relating to the first master symmetric key.

The mobile application 110 is able to receive, over the bi-directional link 113, from the HME 102 a second key possession proof possibly along with other data.

According to an essential invention feature, the mobile application 110 is adapted to verify, by using the (received) second key possession proof, whether the second key possession proof has or has not been generated by using the first derived symmetric key.

To carry out such a verification while using the received data, the mobile application 110 e.g. decrypts e.g. the (received) encrypted hash of the second nonce by using a predetermined second decryption algorithm (that is preferably the second encryption algorithm used by the HME 102) and the first derived symmetric key, so as to get the hash of the second nonce, as a second reference to be matched. The mobile application 110 e.g. decrypts e.g. the (received) encrypted second nonce by using a predetermined second decryption algorithm (that is preferably the second encryption algorithm used by the HME 102) and the first derived symmetric key. Then, the mobile application 110 e.g. generates a hash of the second nonce and compares the hash of the second nonce to the second reference. If the hash of the second nonce does not match the second reference, then the verification fails. Otherwise, i.e. if the hash of the second nonce matches the second reference, the verification succeeds.

In case of verification failure, if the second key possession proof has not been generated by using the first derived symmetric key, then the mobile application 110 fails to authenticate or prove that the HME 102 possesses the first derived symmetric key. In such a verification failure case, the mobile application 110 can not trust the HME 102.

Otherwise, i.e. in case of verification success, if the second key possession proof has been generated by using the first derived symmetric key, then the mobile application 110 authenticates (or proves) successfully that the HME 102 possesses the first derived symmetric key. In such a verification success case, the mobile application 110 can trust the HME 102.

The mobile application 110 is able to send, over a bi-directional link 113, to the HME 102 the first key possession proof along with the key generation parameter(s) that has(have) been used to generate the first derived symmetric key. The mobile application 110 is preferably able to send, besides the first key possession proof and the key generation parameter(s), data relating to a unique identifier relating to the first master symmetric key.

According to an essential invention feature, the HME 102 is adapted to verify, by using the (received) first key possession proof, the (received) key generation parameter(s) and the first master symmetric key that is preferably (but not mandatory) identified by received data, whether the first key possession proof has or has not been generated by using the first derived symmetric key.

To carry out such a verification while using the received data, the HME 102 identifies the first master symmetric key by using the received data, and e.g. decrypts e.g. the (received) encrypted hash of the first nonce by using a predetermined first decryption algorithm (that is the first encryption algorithm used by the mobile application 110) and the first derived symmetric key, so as to get the hash of the first nonce, as a first reference to be matched. The HME 102 identifies the first master symmetric key by using the received data, and e.g. decrypts e.g. the (received) encrypted first nonce by using a predetermined first decryption algorithm (that is the first encryption algorithm used by the mobile application 110) and the first derived symmetric key. Then, the HME 102 e.g. generates a hash of the first nonce and compares the hash of the first nonce to the first reference. If the hash of the first nonce does not match the first reference, then the verification fails. Otherwise, i.e. if the hash of the first nonce matches the first reference, the verification succeeds.

As a result of verification, if the first key possession proof has not been generated by using the first derived symmetric key, then the HME 102 fails to authenticate or prove that the mobile application 110 possesses the first derived symmetric key. In such a failure case, the HME 102 can not trust the mobile application 110.

Otherwise, i.e., as a result of verification, if the first key possession proof has been generated by using the first derived symmetric key, the HME 102 authenticates (or proves) successfully that the mobile application 110 possesses the first derived symmetric key. In such a success case, the HME 102 can trust the mobile application 110.

According to an essential invention feature, the HME 102 is adapted to generate, by using the first derived symmetric key, e.g. an encrypted second nonce and/or an encrypted hash of the second nonce or the like, as a second key possession proof.

To generate the second key possession proof, the mobile application 110 uses a predetermined second encryption algorithm, like e.g., an AES, a DES or a 3DES, with the first derived symmetric key. As known per se, a corresponding second decryption algorithm is the second encryption algorithm.

The second encryption algorithm may be either distinct from the first encryption algorithm or identical to the first encryption algorithm.

If at least one authentication of the first key possession proof and/or the second key possession proof fails, then the first and the second application do not authenticate mutually.

On the contrary, if an authentication of the first key possession proof and an authentication of the second key possession proof succeed, then the first and the second application authenticate mutually (successfully).

Figure 2:
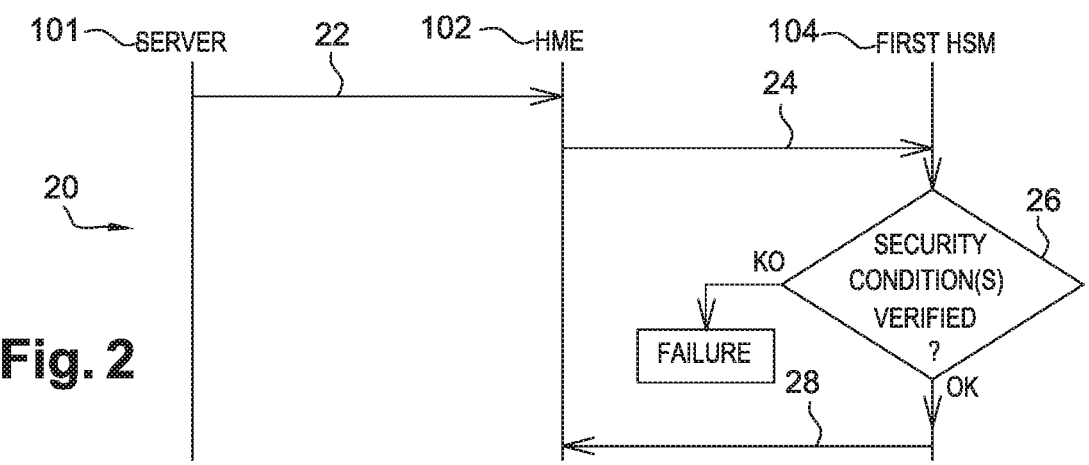
FIG. 2 represents a simplified message flow between the first application and the first HSM of FIG. 1, in which the first HSM, as a first root of trust within the trust chain, provides the first application with one or several master symmetric keys after having authenticated successfully the first application and/or verified successfully an attestation of the first application, according to the invention.

As shown in FIG. 2, the first HSM 104 provides, preferably securely, i.e. after having verified that one or several predetermined security constraints are satisfied by the HME 102, the HME 102 with one or several master symmetric keys, as a first master symmetric key set.

Such a secure verification that one or several predetermined security constraints is satisfied by the HME 102 allows establishing a previous trust between the HME 102 and the first HSM 104. The HME 102 is thus tethered to the first HSM 104, such that there is a strong trust binding between the HME 102 and the first HSM 104.

The cloud server 101 (more exactly the host application) launches an execution of the HME 102 by sending to the HME 102 a corresponding launching request 22.

The HME 102 is executed while carrying out one or several predetermined security processes, like e.g., an application attestation process, an application authentication process and/or a user authentication process, by using one or several keys.

The predetermined security processes may include an application attestation process by using e.g. a predetermined asymmetric key stored securely by the HME 102 and a predetermined attestation algorithm, such as a Message Authentication Code (or MAC) algorithm.

The predetermined security processes may include a code (or application) authentication process by using e.g. a predetermined authentication key stored securely by the HME 102 and a predetermined authentication algorithm.

The predetermined security processes may include a user authentication process by using e.g. a predetermined user authentication key stored securely by the HME 102 and a predetermined user authentication algorithm.

The HME 102 sends to the first HSM 104 one or several messages 24 including an attestation report, code authentication data and/or user authentication data, as submitted data.

The first HSM 104 verifies 26 whether the (received) submitted data does or does not match the expected (or predetermined) security process result(s), like e.g., an expected application attestation process result, an expected application authentication process result and/or an expected user authentication process result.

If the submitted data does not match the expected security process result(s), then the first HSM 104 fails to verify the security process(es) to be satisfied by the HME 102. The first HSM 104 may send to the HME 102 a message (not represented) including an error code or a failure code. Such an error code or a failure code allows informing the HME 102 that the HME 102 does not satisfy the required security process(es).

Otherwise, i.e. only if the submitted data match(es) the expected security process result(s), the first HSM 104 verifies successfully the security process(es) to be satisfied, like e.g, verifies successfully the attestation of the HME 102, authenticates successfully the HME 102 and/or authenticates successfully an HME 102 user.

Once verified successfully, the first HSM 104, as a first root of trust within the distributed trust chain, sends to the HME 102 one or several messages 28 including the first master symmetric key set (and/or the second master symmetric key set), as a security proof(s), like e.g., a proof of authenticity and integrity of the HME 102, a proof of an authenticated HME 102 and/or a proof of an authenticated HME user. The first HSM 104 establishes thus trust with the HME 102.

Once the HME 102 has received, as a security proof(s), the first master symmetric key set (and/or the second master symmetric key set), the HME 102 may establish mutual authentication (and therefore trust) with the mobile application 110 (and/or any other mobile application) managed by the second HSM 108.

Figure 3:
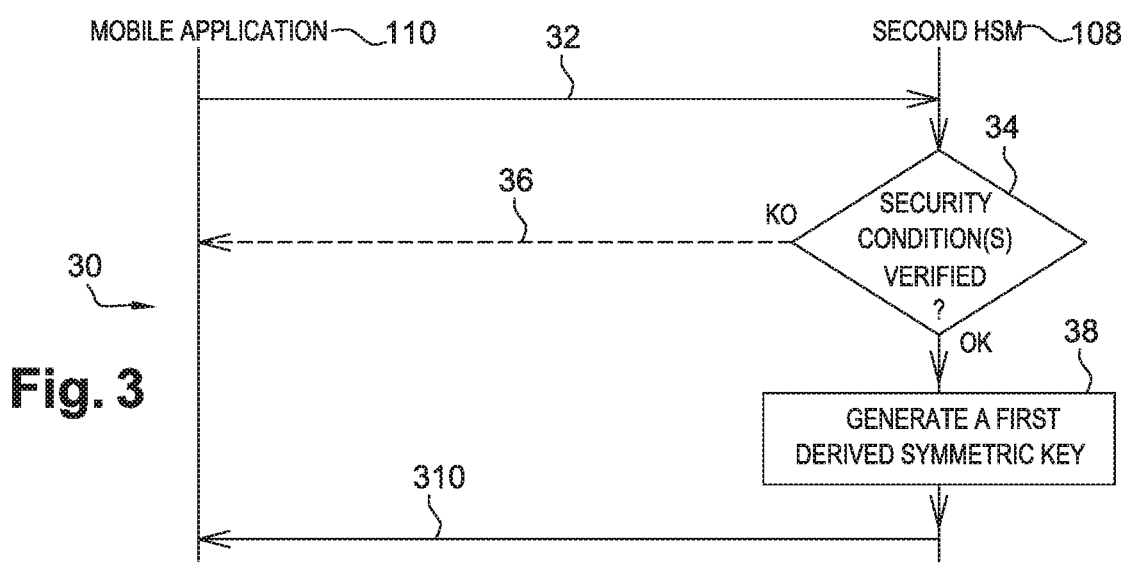
FIG. 3 is a simplified message flow between the second application and the second HSM of FIG. 1, in which the second HSM, as a second root of trust within the trust chain, generates dynamically the first derived symmetric key based on a first master symmetric key shared between the HSMs and the first application and provides the second application with the first derived symmetric key after having authenticated successfully the second application and/or verified successfully an attestation of the second application, according to the invention.

As shown in FIG. 3, the second HSM 108 provides, preferably securely, i.e. after having verified that one or several predetermined security constraints are satisfied by the mobile application 110, the mobile application 110 with the first derived symmetric key.

Such a secure verification that one or several predetermined security constraints is satisfied by the mobile application 110 allows establishing a previous trust between the mobile application 110 and the second HSM 108. The mobile application 110 is thus tethered to the second HSM 108, such that there is a trust binding between the mobile application 110 and the second HSM 108.

The phone 111 (more exactly the host application) launches an execution of the mobile application 110 by sending to the mobile application 110 a corresponding launching request 32.

The mobile application 110 is executed while carrying out one or several predetermined security processes, like e.g., an application attestation process, an application authentication process and/or a user authentication process, by using one or several keys.

The predetermined security processes may include an application attestation process by using e.g. a predetermined asymmetric key stored securely by the mobile application 110 and a predetermined attestation algorithm, such as a MAC algorithm.

The predetermined security processes may include a code (or application) authentication process by using e.g. a predetermined authentication key stored securely by the mobile application 110 and a predetermined authentication algorithm.

The predetermined security processes may include a user authentication process by using e.g. a predetermined user authentication key stored securely by the mobile application 110 and a predetermined user authentication algorithm.

The mobile application 110 sends to the second HSM 108 one or several messages 34 including an attestation report, code authentication data and/or user authentication data, as submitted data.

The second HSM 108 verifies 34 whether the (received) submitted data does or does not match the expected (or predetermined) security process result(s), like e.g., an expected application attestation process result, an expected application authentication process result and/or an expected user authentication process result.

If the submitted data does not match the expected security process result(s), then the second HSM 108 fails to verify the security process(es) to be satisfied by the mobile application 110. The second HSM 108 may send to the mobile application 110 a message 36 including an error code or a failure code. Such an error code or a failure code allows informing the mobile application 110 that the mobile application 110 does not satisfy the required security process(es).

Otherwise, i.e. only if the submitted data match(es) the expected security process result(s), the second HSM 108 verifies successfully the security process(es) to be satisfied, like e.g., verifies successfully the attestation of the mobile application 110, authenticates successfully the mobile application 110 and/or authenticates successfully an mobile application 110 user.

Once the mobile application 110 satisfies (successfully) the required security process(es), the second HSM 108 generates 38 dynamically a first derived symmetric key (that is unique) by using e.g. a nonce that is preferably large, i.e. more than 256bits, as a key generation parameter(s) used to generate the first derived symmetric key, and a first master symmetric key that is preferably selected from the second (or first) master symmetric key set (when this latter includes two or more master symmetric keys).

Once the first derived symmetric key is generated, the second HSM 108, as a second root of trust within the distributed trust chain, sends to the mobile application 110 one or several messages 310 including, as a security proof(s), like e.g., a proof of authenticity and integrity of the mobile application 110, a proof of an authenticated mobile application 110 and/or a proof of an authenticated mobile application 110 user, the first derived symmetric key, the key generation parameter(s) and possibly data relating to a unique identifier relating to the first master symmetric key. The second HSM 108 establishes thus trust with the mobile application 110.

Once the mobile application 110 has received, as a security proof(s), the first derived symmetric key, the key generation parameter(s) and possibly data relating to a unique identifier relating to the first master symmetric key, the mobile application 110 may establish mutual authentication (and therefore trust) with the HME 102 (and/or any other HME) managed by the first HSM 104.

Figure 4:
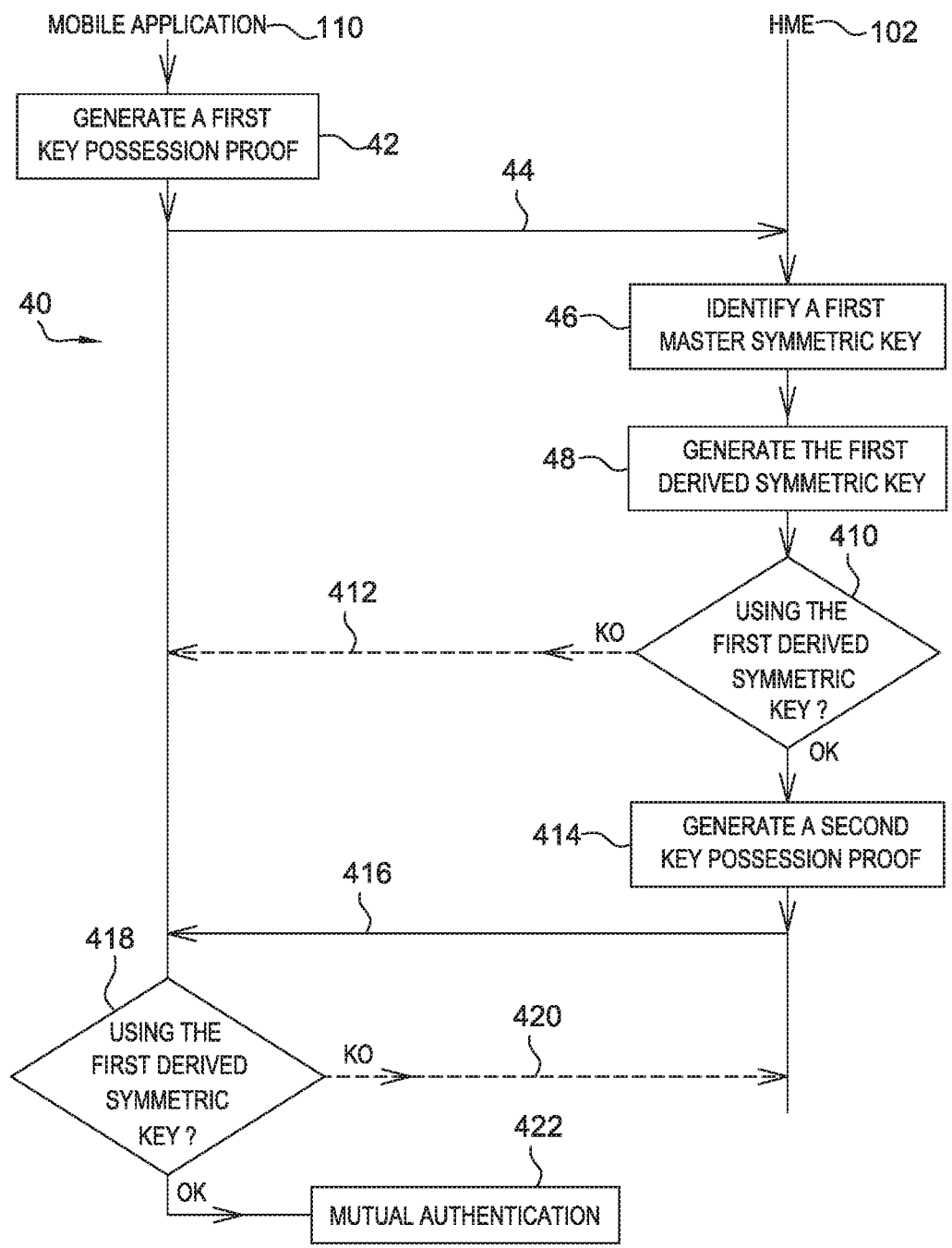
FIG. 4 is a simplified message flow between the first and the second application of FIG. 1, in which each of the two applications proves that the other of the two applications possesses the first derived symmetric key that has been previously generated on the fly based on a first master symmetric key that is, on the one hand, shared securely between the HSMs and, on the other hand, provided to the first application, according to the invention.

FIG. 4 depicts an exemplary embodiment of messages 40 exchanged between the mobile application 110 and the HME 102. It is assumed that the HME 102 has received, as a security proof(s), the second master symmetric key set in association with a respective corresponding UUID, as data relating to a unique identifier relating to each master symmetric key (included in the second master symmetric key set).

It is further assumed that the mobile application 110 has received, as a security proof(s), the first derived symmetric key, the key generation parameter(s) and the UUIDx of the first master symmetric key, as data relating to a unique identifier relating to the first master symmetric key.

It is still further assumed that the first derived symmetric key has been generated by using e.g., a large nonce, as a unique key generation parameter.

It is still further assumed that the first master symmetric key is included within the second master symmetric key set that has been previously generated by the second HSM 108 and transmitted or propagated to the first HSM 104.

Firstly, the mobile application 110 generates 42 a first key possession proof by using the first derived symmetric key.

To generate the first key possession proof, the mobile application 110 may generate a first nonce and then encrypt the first nonce by using the first derived symmetric key. The mobile application 110 may further generate preferably a hash of the first nonce and then encrypt the hash of the first nonce by using the first derived symmetric key. The encrypted hash of the first nonce allows the HME 102 to generate a first reference to be matched during a verification of the first key possession proof.

Once the first key possession proof is generated, the mobile application 110 sends to the HME 102 one or several messages 44 including the encrypted first nonce, as the first key possession proof, preferably the encrypted hash of the first nonce, the UUIDx of the first master symmetric key and the large nonce, as the key generation parameter that has been used to generate the first derived symmetric key.

Once the message 44 is received by the HME 102, the HME 102 identifies 46, based on the UUIDx of the first master symmetric key, the first master symmetric key that has been used to generate the first derived symmetric key.

Once the first master symmetric key is identified, the HME 102 generates 48 the first derived symmetric key by using the first master symmetric key and the large nonce, as the key generation parameter. The HME 102 uses the predetermined key generation algorithm that is used by the second HSM 108 to generate the first derived symmetric key.

Once the first derived symmetric key is generated, the HME 102 verifies 410 by using the key generation parameter, the (identified) first master symmetric key and the first key possession proof, whether the first key possession proof has or has not been generated by using the first derived symmetric key.

To do such a verification 410, the HME 102 decrypts e.g. the encrypted first nonce by using the first derived symmetric key, so as to get the first nonce in plain text. Then, the HME 102 generates a hash of the first nonce and compares the (just generated) hash of the first nonce to the received first reference to be matched.

If the comparison fails, i.e. the hash of the first nonce does not match the received first reference to be matched, then the first key possession proof has not been generated by using the first derived symmetric key and the HME 102 fails to authenticate the mobile application 110. The HME 102 may send a message 412 including an error code or a failure code. Such an error code or a failure code allows informing the mobile application 110 that the HME 102 fails to authenticate the mobile application 110.

If the comparison is successful, i.e. the hash of the first nonce matches the received first reference to be matched, then the first key possession proof has been generated by using the first derived symmetric key and the HME 102 authenticates successfully the mobile application 110.

Once the mobile application 110 is successfully authenticated, the HME 102 generates 414 a second key possession proof by using the first derived symmetric key.

To generate the second key possession proof, the HME 102 may generate a second nonce and then encrypt the second nonce by using the first derived symmetric key. The HME 102 may further generate preferably a hash of the second nonce and then encrypt the hash of the second nonce by using the first derived symmetric key. The encrypted hash of the second nonce allows the mobile application 110 to generate a second reference to be matched during a verification of the second key possession proof.

Once the second key possession proof is generated, the HME 102 sends to the mobile application 110 one or several messages 416 including the encrypted second nonce, as the second key possession proof, and preferably (but not mandatorily) the encrypted hash of the second nonce.

Once the second key possession proof is received, the mobile application 110 verifies 416 by using at least the second key possession proof, whether the second key possession proof has or has not been generated by using the first derived symmetric key.

To do such a verification 416, the mobile application 110 decrypts e.g. the encrypted second nonce by using the first derived symmetric key, so as to get the second nonce in plain text. Then, the mobile application 110 generates a hash of the second nonce and compares the (just generated) hash of the second nonce to the received second reference to be matched.

If the comparison fails, i.e. the hash of the second nonce does not match the received second reference to be matched, then the second key possession proof has not been generated by using the first derived symmetric key and the mobile application 110 fails to authenticate the HME 102. The mobile application 110 may send a message 420 including an error code or a failure code. Such an error code or a failure code allows informing the HME 102 that the mobile application 110 fails to authenticate the HME 102.

If the comparison is successful, i.e. the hash of the second nonce matches the received second reference to be matched, then the second key possession proof has been generated by using the first derived symmetric key and the mobile application 110 authenticates successfully the HME 102.

Once the mobile application 110 authenticates successfully the HME 102, the mobile application 110 and the HME 102 authenticates 422 successfully mutually by mutually proving that the HME 102 and the mobile application 110 possesses each the first derived symmetric key, as a thus dynamically generated and proven shared key.

The trust chain network thus includes, besides the first HSM 104 and the second HSM 108, the HME 102 and the mobile application 110, as additional elements of the trust chain.

The first derived symmetric key may be valid for a predetermined first life time period, such as each hour or 30 minutes.

The second HSM 108 may generate a second derived symmetric key that is distinct from the first derived symmetric key by changing the first master symmetric key and/or one or several parameters that (has)have been used to generate the first derived symmetric key.

The HME 102 and the mobile application 110 may generate (not represented) separately a session key based on e.g. the first nonce and/or the second nonce, as data that may have been used to generate the first key possession proof and/or the second key possession proof respectively and that is shared by the HME 102 and the mobile application 110.

Once the HME 102 and the mobile application 110 share the same session key based on shared data, like e.g., the first derived symmetric key and/or data used to prove that the other application possesses the first derived symmetric key, the HME 102 and the mobile application 110 may transact continuously and securely (while using the session key).

The session key may be encrypted by using a second master symmetric key that is distinct from the first master symmetric key. The second master symmetric key is shared between the first HSM 104 and the second HSM 108.

The HME 102 (or the mobile application 110) may send to the mobile application 110 (or the HME 102 respectively) one or several messages (not represented) including, as session key information, a session key that is previously encrypted by using a second master symmetric key that is distinct from the first master symmetric key, data relating to a unique identifier relating to the second master symmetric key, and/or a predetermined life time period during which the session key is valid. Such session key information is preferably inserted in the header of each message, since the header content is not encrypted, i.e. in plain text.

The first HSM 104, the second HSM 108, a third HSM that is comprised within the distributed trust chain while being distinct from the first 104 and second 108 HSMs may send to a third application, that is distinct from the HME 102 and the mobile application 110, the first master symmetric key set and/or the second master symmetric key set. And the HME 102 or the mobile application 110 sends to the third application the session key information, so as to exchange securely with the third application while using one and the same session key. Such a session key information transmission allows propagating the session key information to the third application. Such a session key information transmission allows ensuring portability of the communication from the first or second application to the third application, notably in the context of a payload balancing or a virtual payload balancing. The communication with the third application will then be secured while using the session key information in every data exchange. The third application will then use the session key information to decrypt data to be received by the third application and to encrypt data to be sent from the third application.

Any service provider, any end-user and/or any application that use(s) one or several of the master symmetric keys managed within the HSM trust chain, like e.g., the first master symmetric key, can trust that the concerned master symmetric key(s) can not be compromised, even by the involved service providers themselves.

The invention solution allows offering preferably a high assurance confidentiality and integrity of the secure code/data (like e.g., the HME).

The invention solution allows offering preferably a high speed attestation mechanism which uses symmetric keys. Such a high speed attestation mechanism allows two end-points, at least one of which terminates within an HME (or the like), as secure code/data, to quickly establish trust with each other using high speed symmetric cryptography.

The invention solution allows offering a high assurance isolation of a secure code/data (like e.g., the HME) versus a less secure (or unsecure) code (like e.g., the mobile application). Such an isolation allows for sensitive code and sensitive information to be hosted within a virtual payload while remaining safe from side-channel attacks and attacks from malicious insiders, such as cloud administrators.

The invention solution allows offering a way for separate service providers to establish trust between each other such that an application(s) and possibly a secure payload(s) running on a system (with an HSM type server(s)) operated by one service provider can establish trust (i.e. attestation) with another application(s) and another secure payload(s) running on another system (with another HSM type server(s)) operated by another service provider. The invention solution allows for trust to span across a widely distributed system while involving a secure code (like e.g., an HME) and an HSM type server network.

The invention solution allows offering two sided repudiations, i.e. the first application knows that the second application is the genuine one and conversely.

The invention solution does not need any measurement, i.e. any signature based on a PKI technology.

The invention solution is simple and secure since it is based on a symmetric cryptography using a dynamically derived key.

The invention solution is fast since it is based on a symmetric cryptography.

The invention claimed is:

1. A method for mutual symmetric authentication between a first application and a second application, comprising the following steps:
    a first server, as a first element comprised within a distributed trust chain, sends to and/or receives from, at least one second server, as a second element comprised within the distributed trust chain, at least one master symmetric key;
    the first server sends, to the first application, the at least one master symmetric key;
    the second server generates dynamically a first derived symmetric key by using at least one key generation parameter and a first master symmetric key comprised within the at least one master symmetric key;
    the second server sends, to the second application, the first derived symmetric key and the at least one key generation parameter;
    the second application generates a first key possession proof by using the first derived symmetric key;
    the second application sends, to the first application, the first key possession proof and the at least one key generation parameter;
    the first application verifies successfully by using the at least one key generation parameter, the first master symmetric key and the first key possession proof, that the first key possession proof has been generated by using the first derived symmetric key;
    the first application generates a second key possession proof by using the first derived symmetric key;
    the first application sends, to the second application, at least the second key possession proof; and
    the second application verifies successfully by using the second key possession proof that the second key possession proof has been generated by using the first derived symmetric key, as a dynamically generated and proven shared key.

2. Method according to claim 1, wherein, prior to sending to the first application the at least one master symmetric key, the first server, as a first root of trust within the distributed trust chain, verifies successfully the attestation of the first application and/or authenticates successfully the first application, the thus provided at least one master symmetric key becoming a proof of authenticity and integrity of the first application and/or a proof of an authenticated first application; and/or
    prior to sending to the second application the first derived symmetric key, the second server, as a second root of trust within the distributed trust chain, verifies successfully the attestation of the second application and/or authenticates successfully the second application, the thus provided first derived symmetric key becoming a proof of authenticity and integrity of the second application and/or a proof of an authenticated second application.

3. Method according to claim 1, wherein, the first server sending and/or receiving the at least one master symmetric key, the first server further sends and/or further receives data relating to a unique identifier relating to each of the at least one master symmetric key, and the second application receiving and sending the at least one key generation parameter, the second application further receives and further sends data relating to a unique identifier relating to the first master symmetric key.

4. Method according to claim 1, wherein the first derived symmetric key is valid for a predetermined first life time period.

5. Method according to claim 4, wherein the second server generates a second derived symmetric key that is distinct from the first derived symmetric key by changing at least one key generation parameter comprised within the at least one key generation parameter and/or the first master symmetric key.

6. Method according to claim 1, wherein the first key possession proof includes an encrypted first nonce and/or with an encrypted hash of the first nonce.

7. Method according to claim 1, wherein the second key possession proof includes an encrypted second nonce and/or an encrypted hash of the second nonce.

8. Method according to claim 1, wherein the first application and the second application generate separately a session key based upon the first key possession proof and/or the second key possession proof.

9. Method according to claim 1, wherein the first application sends to the second application, as session key information, at least one element of a group comprising:
    a session key that is previously encrypted by using a second master symmetric key that is distinct from the first master symmetric key;
    data relating to a unique identifier relating to the second master symmetric key;
    a predetermined life time period during which the session key is valid.

10. Method according to claim 9, wherein the method further comprises:
    the first server, the second server or a third server sends to a third application the at least one master symmetric key, the third server, as a third element comprised within the distributed trust chain, being distinct from the first server and the second server, the third application being distinct from the first application and the second application; and
    the first application or the second application sends to the third application, the received session key information, so as to exchange securely with the third application while using the session key.

* * * * *